United States Patent [19]

Wallace et al.

[11] 4,288,069

[45] Sep. 8, 1981

[54] CAM OPERATED DOCUMENT STOP FOR HIGH SPEED ITEM SORTER

[75] Inventors: Harry L. Wallace, Livonia; John D. Thomas, Plymouth, both of Mich.

[73] Assignee: Burroughs Corporation, Detroit, Mich.

[21] Appl. No.: 87,228

[22] Filed: Nov. 29, 1979

[51] Int. Cl.³ .............................................. B65H 9/06
[52] U.S. Cl. ..................................... 271/245; 271/256
[58] Field of Search .............. 271/245, 246, 247, 303, 271/256, 182, 8 R, 8 A, 235, 266

[56] References Cited

U.S. PATENT DOCUMENTS

| 3,263,992 | 8/1966 | Schrempp | 271/246 |
| 3,804,507 | 4/1974 | Koch et al. | 271/246 X |
| 4,068,212 | 1/1978 | Templeton | 271/303 X |
| 4,073,391 | 2/1978 | O'Brien et al. | 271/246 X |

OTHER PUBLICATIONS

Bullock, R. L. et al., *IBM Technical Disclosure Bulletin,* vol. 19, No. 5, Nov. 1976, pp. 1955-1956.

*Primary Examiner*—Bruce H. Stoner, Jr.
*Attorney, Agent, or Firm*—Delbert P. Warner; Charles E. Quarton; Kevin R. Peterson

[57] ABSTRACT

A cam operated document stop in an item sorter provides positive action to halt the passage of a document or other item, from a flow of documents in a mainstream pathway, when it arrives in an inspection station. The document is stopped in an open receptacle area for inspection and then released for return to the mainstream pathway. Stoppage is effected by rotation of cam members which position a stop arm to stop the flow of the document. After the document has been inspected and corrected, the stop arm is repositioned to release the document into the mainstream flow. After a suitable delay to allow the document to clear the receptacle area, the cam members rotate the stop arm into position to stop the next document.

3 Claims, 9 Drawing Figures

HOLD AND VIEW MODULE

CAM OPERATED DOCUMENT STOP FOR HIGH SPEED ITEM SORTER

BACKGROUND OF THE INVENTION

1. Field of the Invention

The invention relates to apparatus for diverting articles from the mainstream of transportation in sorting apparatus to a receptacle area for inspection and back to the mainstream. It relates more particularly to apparatus for stopping the forward motion of an article and retaining it free of motion in a receptacle area for a time before returning it to the mainstream.

2. Description of the Prior Art

A description of related prior art is found in U.S. Pat. No. 4,155,842 relating to a "Document Hold and View Station for High Speed Item Sorter and Apparatus". That patent is assigned to the same assignee as the present invention and is hereby incorporated by reference.

The art disclosed in the referenced patent shows the use of a viewing chamber for inspecting documents where the documents come to a halt due to friction, but does not disclose the use of specific means for stopping the flow of documents in the viewing chamber. It is known from other prior art that positive stop mechanisms such as a solenoid operated stop may be used to hold documents for inspection and subsequent release in a viewing chamber, but it is preferred in the present invention to employ apparatus dispensing with the need for additional power controlled devices for this purpose.

SUMMARY OF THE INVENTION

The present invention relates to a document stop for positively holding and releasing documents in a hold and view station of a high speed item sorter. Embodiments of the document stop include a stop arm which is controlled by a mechanical linkage including an actuating arm and a detent cam. The linkage drives the stop arm from a first position permitting the flow of documents through a hold and view station to a second position blocking the flow of documents through the hold and view station. In the second position a single document may be held to enable an inspector to visually examine the document and correct it if necessary before returning it to the mainstream of flow.

In practice, the actuator arm is pivoted about an axis in a space adjacent to the hold and view station. One end of the actuator arm incorporates a pin adapted to engage the detent cam and the other end of the arm includes a buffer surface adapted to engage the stop arm. The cam is mechanically coupled to a shaft in the hold and view module causing it to be driven by the sorter apparatus. Rotation of the cam causes the actuator arm to move about its axis and drive the detent arm between a position blocking the flow of documents and a position permitting free flow of documents.

DESCRIPTION OF A PREFERRED EMBODIMENT

Figure 1:
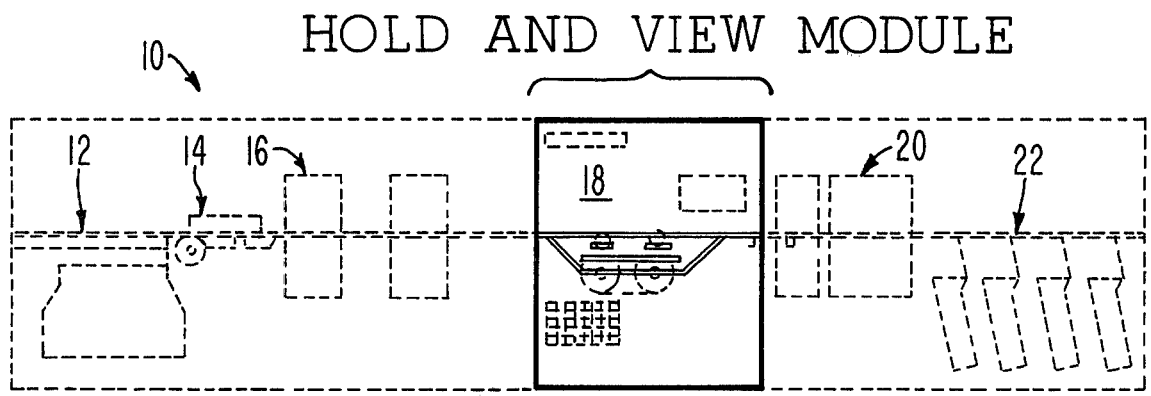
FIG. 1 is a schematic plan view of a reader/sorter system showing the relationship of a hold and view module to the total system.

Turning now to FIG. 1, a high speed document feeder and sorter is indicated at 10. As explained more fully in U.S. Pat. No. 4,155,842, the document feeder and sorter includes a number of modules which transmit documents from a demand and feed assembly at 12 past read assemblies at 14 and 16 where a determination is made whether or not to pass each document on to an encoder/endorser assembly at 20 for sorting by apparatus at 22. If the decision is made not to pass the document along directly, it is diverted to the hold and view module 18, where a detailed examination and correction of the document may be made.

As is explained more fully in the patent referenced above, after a document 30 is diverted to the assembly 18 (FIG. 2) it stops in the open V-shaped viewing chamber 36. After the document has been inspected by the operator and the operator has made corrections or taken whatever other steps are necessary, the document may be transmitted back into the transmit path. Return of the document to the transmit path from the open chamber 36 is accomplished when the operator (by means not shown) energizes a motor 48 which drives identical semicircular cams 44 through the shaft 46 and a belt 56. As the cams 44 turn they space the document against idler wheels at 60 and drive the document from the open chamber 36.

The present invention operates in cooperation with the driving apparatus in the hold and view module to positively detain documents of interest in the viewing chamber for a desired period. On command from the operator, it then releases them as the driving apparatus of the hold and view module is activated to return the document to the feed stream.

Figure 3:
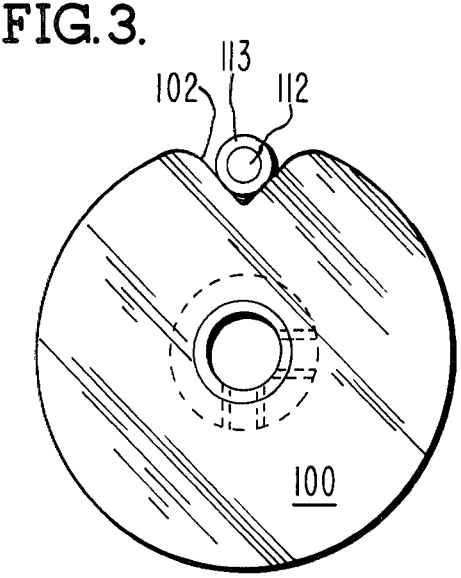
FIG. 3 is a plan view of a cam employed to control motion of the stop means.
Figure 4:
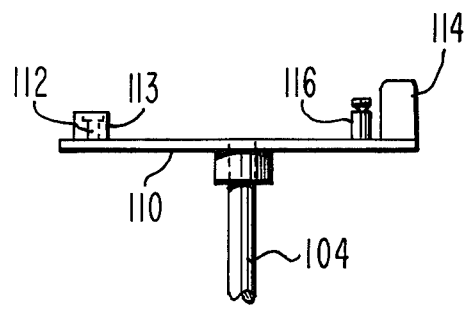
FIG. 4 is a side view of an actuator arm according to the invention.

The positive stop mechanism includes a cam at 100 which is secured to the support shaft 50 of the semicircular cam 44 to be driven as cam 44 rotates. As shown more fully in FIG. 3, cam 100 includes a notch at 102 which is dimensioned to engage a bearing 113 and a pin 112 of an actuating arm 110. The actuating arm 110, a side view of which is shown in detail in FIG. 4, is pivoted on a shaft 104 in such a way that a flap 114, which is integral to the actuating arm, is positioned to engage the bumper 122 of a stop arm 120.

Figure 5A:
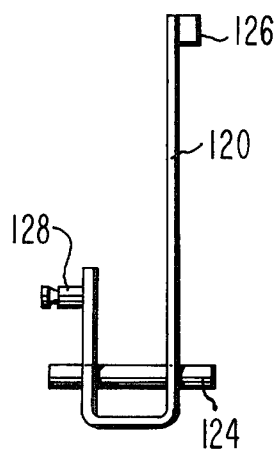
FIGS. 5A, 5B, and 5C depict views of the stop arm.
Figure 5B:
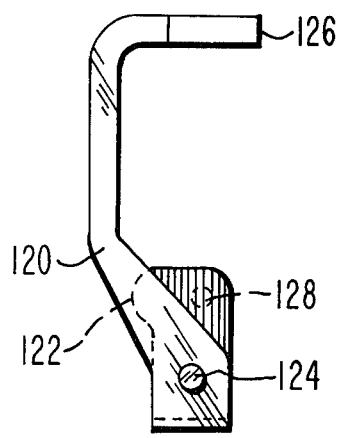
Figure 5C:
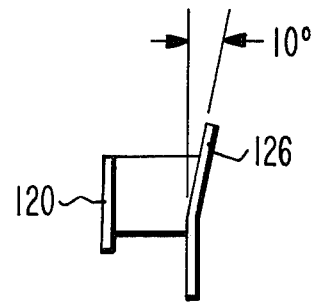

The stop arm 120 is an irregularly shaped piece of metal, as shown in FIGS. 5A, 5B, and 5C, which is formed by stamping or the like. FIG. 5B and FIG. 5C are a side view and a top view, respectively, of FIG. 5A. The stop arm is supported on a shaft 124 so that it may be rocked back and forth, as needed, to enable a portion of the arm indicated at 126, to be inserted through openings 150 and 152 into and removed from the pathway of the documents. As will be seen most clearly from FIG. 2, the stop arm 120 will be rocked into the stop position when the actuating arm 110 rotates counter-clockwise about its axis through shaft 104. When arm 110 rotates clockwise about its axis, a spring 130 which is anchored to pins 116 and 128, will impart forces to the stop arm 120 causing it to rock about the axis through shaft 124 and pull the portion 126 of the stop arm 120 out of the opening 152 and far enough through opening 150 to release the document in the chamber for transmission into the main flowstream of documents.

A timing problem remains with the application of the invention as disclosed to this point. Namely, in many cases the trailing edge of a document will not have sufficient time to clear the viewing station before the document stop arm 120 returns to its home position.

The present invention overcomes this problem of a document being blocked inappropriately by stopping the driving motor 48 at a critical point for a long enough period to allow the document to clear the housing.

Stoppage of the motor is controlled by electrical means in response to a position sensed on the timing disc 160 by sensor means at 162 and 164. The sensing means may, in a preferred embodiment, comprise a light emitting diode 162 and a phototransistor 164 coupled to control the motor as indicated in FIG. 6.

Figure 2:
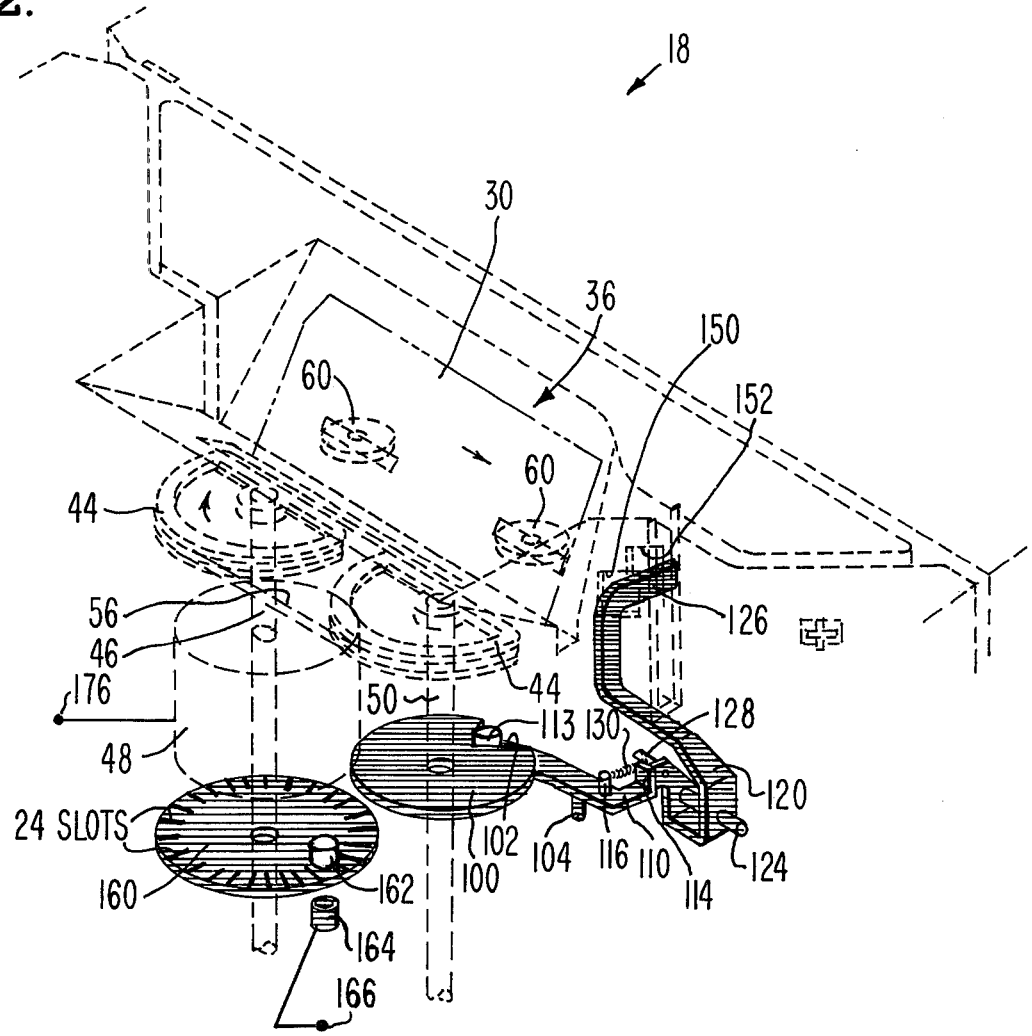
FIG. 2 is a perspective view of a hold and view station showing cam operated stop means according to the invention in solid lines and showing a view of the remainder of the station in dashed lines.
Figure 6:
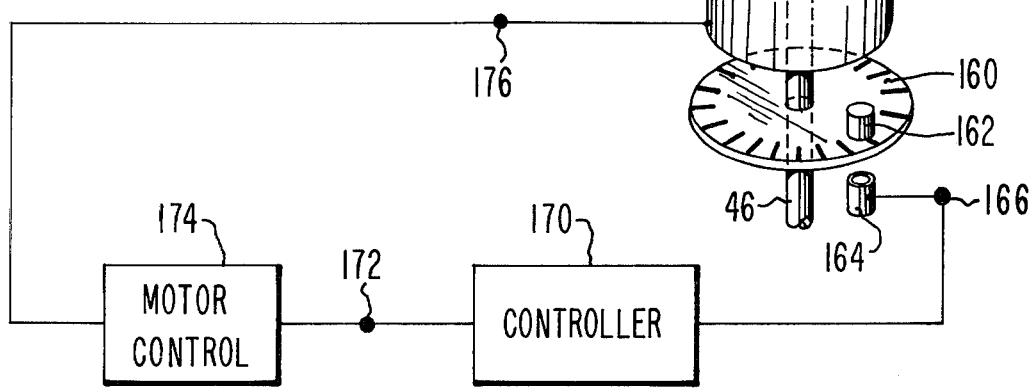
FIG. 6 is a brief diagram showing relationships between the source of timing pulses, the system controller a motor control and the motor.

Control of the motor can be effected through the system controller indicated at 170 in FIG. 6. Timing pulses, from the sensor 164 over terminal 166 of FIG. 2 are applied to the controller 170 where a simple count of 20 pulses, corresponding to 300 degrees in the system, can be made to determine when the motor should be turned off. After it has been turned off, a 53 millisecond delay in the controller circuit is employed to determine when the motor should be turned on again. The outputs of the controller 170 are employed to switch the motor control 174 and thus control power to the motor 48 over terminal 176. The controller may comprise an Intel microprocessor such as an 8048, or the like, which incorporates the necessary means to count 20 pulses, corresponding to 300 degrees, measure the 53 millisecond delay period and provide appropriate signals over terminal 172 to the motor control at 174, which represents conventional apparatus, to turn the motor on and off.

Figure 7:
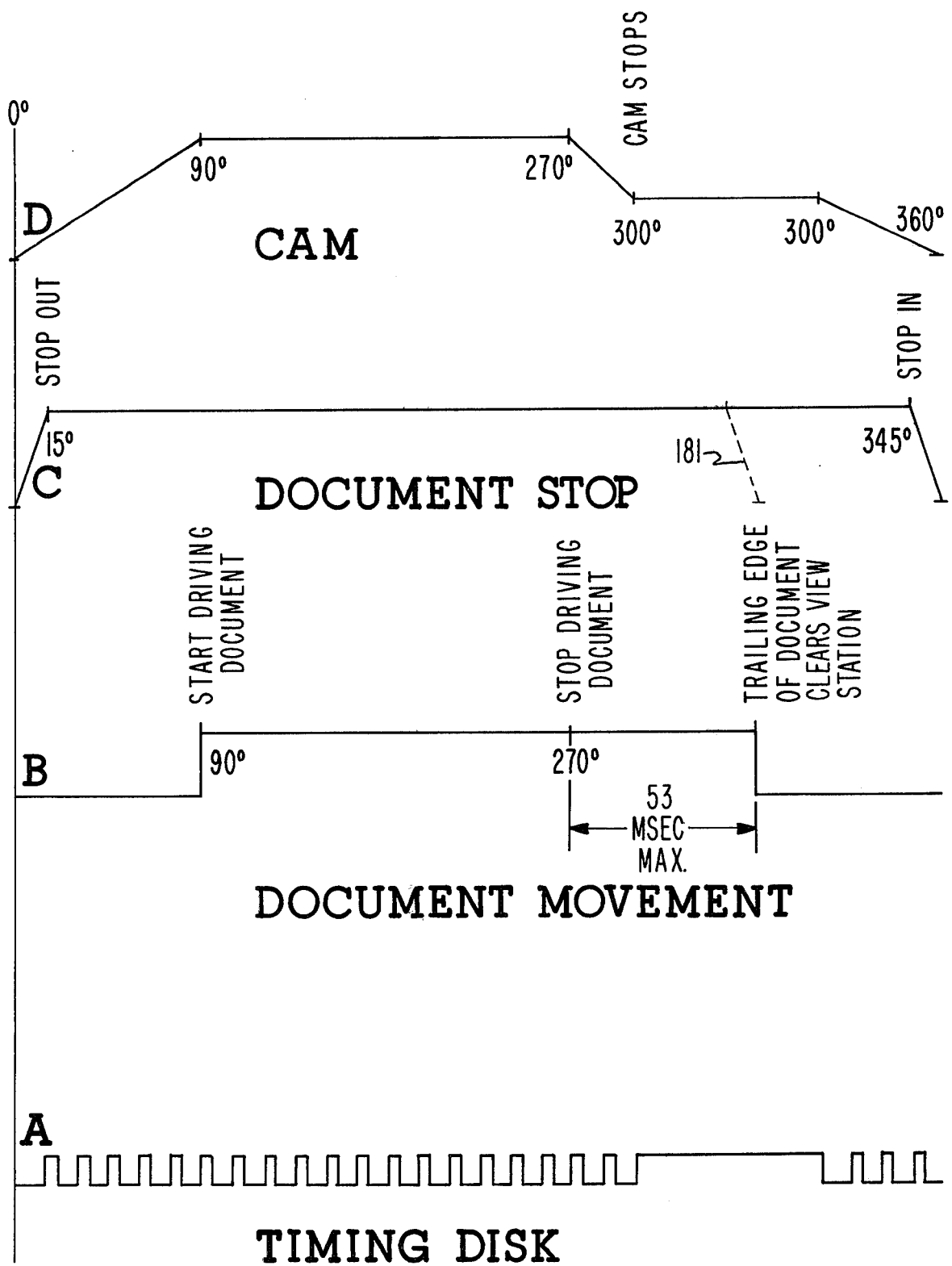
FIG. 7 provides a showing of timing relationships between a timing disc and pulses produced by the disc, document movement, the operation of the document stop and motion of a cam.

The timing chart in FIG. 7 shows various timing relationships involved in the preferred embodiment of the invention. As indicated before, a timing disc is employed to produce pulses indicated on line A. The pulses shown correspond to the number of slots in the disc which pass the sensing means as the disc rotates through 360 degrees. It will be seen on line A that no additional pulses are provided for a short period following the 20th pulse where the 20th pulse, at 15 degrees per pulse, corresponds to an angular spacing of about 300 degrees from a zero point on the timing disc.

The period of no pulses referred to above corresponds to a time during which the stepping motor 48 is turned "off" and motion of the cams (see FIG. 7, line D) on the motor shaft ceases. This period is chosen to be of sufficient length to permit the trailing edge of a document (see 53 MSEC on line B) to clear the end of the open chamber 36 before the stop arm obstructs the passage by reverting to the stop position. This delay in return of the end 126 of the stop arm 120 to the stop position corresponds in length to the time between the 20th and 21st pulses from the timing cam or the time between the two 300 degree points in FIG. 7, line D.

Operation

Referring to the mechanical and electrical elements discussed heretofore, it is clear, starting from a point corresponding to the left edge of FIG. 7 that rotation of the motor 48 will cause the shaft 56, and with it the timing disc and cams, to rotate producing the timed relationships indicated in FIG. 7.

Considering FIG. 7 line A, it will be seen that rotation of the timing disc produces a plurality of precisely spaced pulses from the sensor combination 162 and 164. These pulses are used to time the operation of the motor and to turn it "off" for a time period of about 53 milliseconds after 20 pulses are received.

Line B in FIG. 7 indicates that the rotation of the semi-circular cams 44 causes them to engage a document in the viewing chamber 36 and to start moving it when they have rotated 90 degrees. It indicates further that the cams 44 will disengage the document, and stop moving it, when they rotate 180 degrees and reach the 270 degree point. As indicated on line B, the document having disengaged, the document will take a maximum of about 53 milliseconds to move clear of the viewing chamber. The actual time needed to clear the chamber is, of course, a function of document length where 53 milliseconds is the maximum expected for documents which will usually be sorted by this equipment.

The stop arm is designed to be engaged for a period corresponding to 30 degrees as indicated between 0–15 degrees and 345–360 degrees on line C of FIG. 7. It will be seen that the diagonal dashed line 181 of line C represents the way the document stop would be operated if there were no delays caused by stopping the motor. Under those circumstances the stop arm would close to its stop position thereby striking a document still being ejected within the 53 millisecond period from the viewing chambers. With the delay in the return of the stop arm referred to before, the document will have plenty of time to clear the viewing chamber.

Turning next to line D FIG. 7 for an explanation of the operation of the semi-circular cams 44, it will be realized that at 0 degrees, corresponding to the left edge of the Figure, the cams are at rest with their flat faces parallel to the long edges of the receiving chamber 36. When the motor 48 turns these cams through 90 degrees they will engage the document causing it to move until they turn 270 degrees at which point they will disengage the document and stop driving it. When the motor stops at 300 degrees, as explained above, cams 44 and 100 will stop for the period of 53 milliseconds, allowing the document to be driven by its own inertia from the viewing chamber 36. The motor is then started again to complete the 360 degree revolution and bring the stop arm into the stop position so that it can detain the next document.

What is claimed is:

1. A document stop mechanism for positively blocking and unblocking the passage of a document in a receptacle area of a hold and view station of a high speed sorter comprising:

a stop arm adapted to assume a first position blocking the flow of a document in a receptacle area and a second position permitting unimpeded flow of a document through said receptacle area;

an actuator arm pivoted about an axis linked to said hold and view station with a first end adapted to engage the stop arm;

means coupled between said stop arm and said actuator arm causing the stop arm to follow motion of the actuator arm;

a detent cam incorporating means to engage a second end of the actuator arm;

mechanical linkage means supporting said detent cam, causing it to turn and thereby operate the stop arm;

a motor coupled to the mechanical linkage means for turning said detent cam;

pulse generating means coupled to said motor to provide timing pulses as the detent cam turns; and processing means responsive to said timing pulses to turn the motor off at a particular pulse count for a selected period to permit a document to leave the receptacle area;

said processing means turning the motor on after said selected period to enable the stop arm to return to the stop position.

2. The invention as claimed in claim 1, in which:

the pulse generating means includes a timing disc and electrical sensing means to read the disc slots as the disc turns to provide said timing pulses.

3. A mechanism having a stop mode and a go mode for controlling the flow of documents through a hold and view station of a high speed sorting system, comprising:

a stop arm pivoted to rock between a go position allowing documents to pass and a stop position preventing documents from passing;

an actuator arm linked to said stop arm and pivoted to rotate about an axis between a first position urging said stop arm to its go position and a second position urging said stop arm to its stop position;

a cam linked to said actuator arm and pivoted to rotate about an axis and drive said actuator arm between its first and second positions;

drive means including a motor linked to said cam by a drive shaft to rotate said cam;

sensing means coupled to the drive shaft of the motor to provide a plurality of timing pulses, and processing means responsive to said timing pulses to turn the motor off at a particular pulse count for a selected period to permit documents to leave the hold and view station;

said processing means turning the motor on after said selected period to enable the stop arm to return to the stop position.

* * * * *